Figure 1:
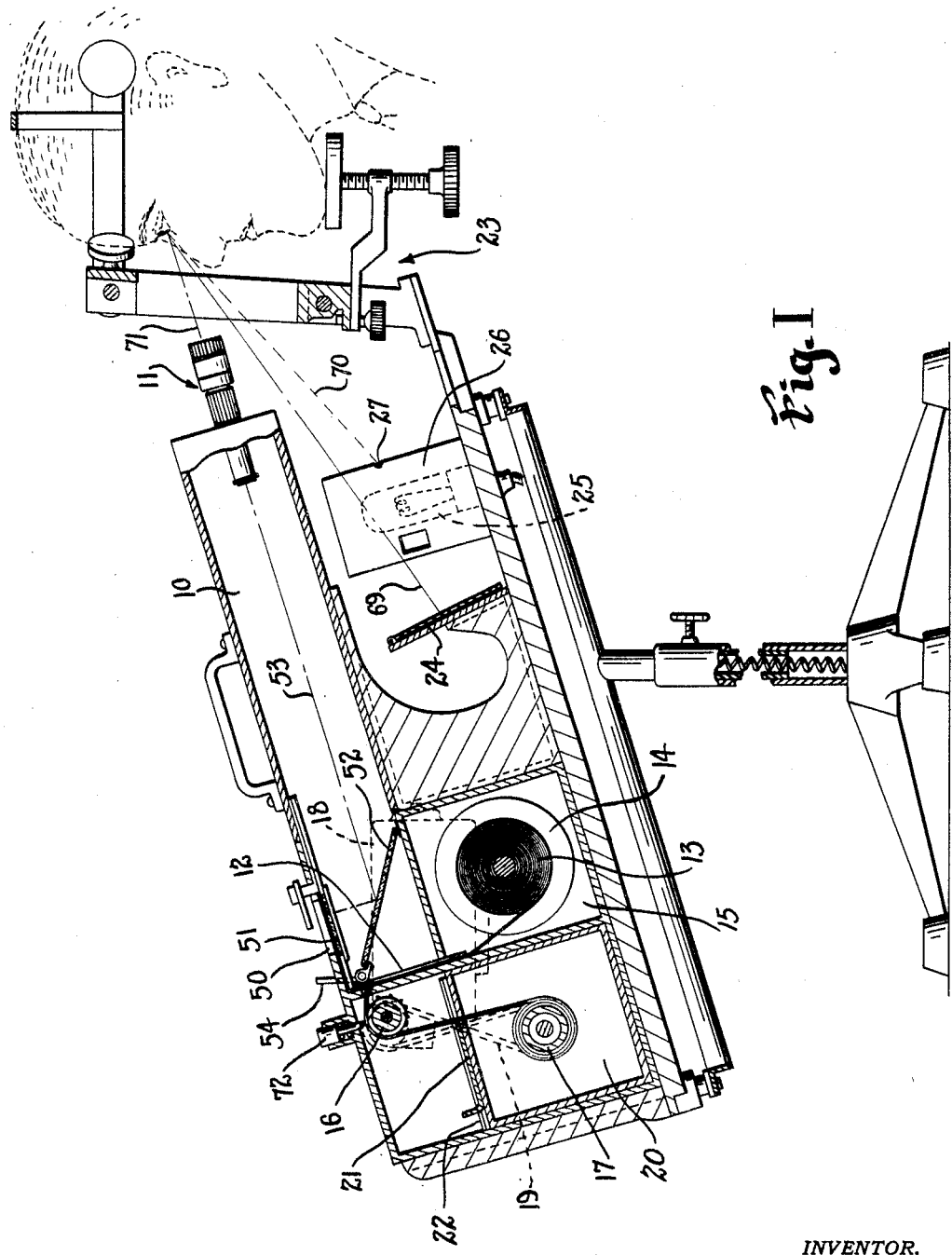

June 30, 1942.  E. D. TILLYER  2,288,216
MEANS FOR RECORDING EYE MOVEMENTS
Filed Aug. 1, 1939  3 Sheets-Sheet 2
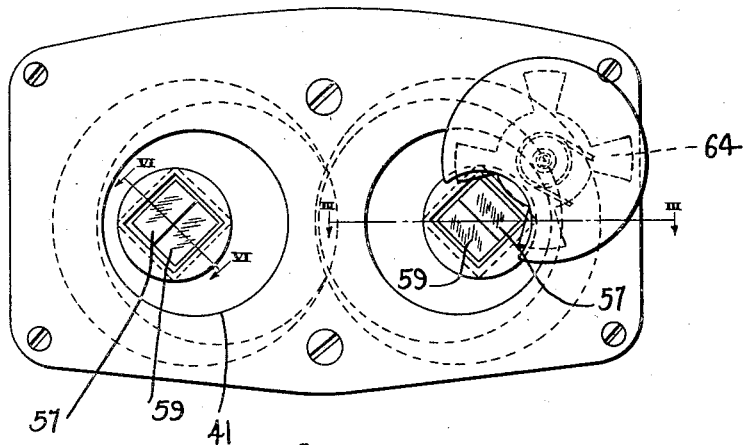
Fig. II
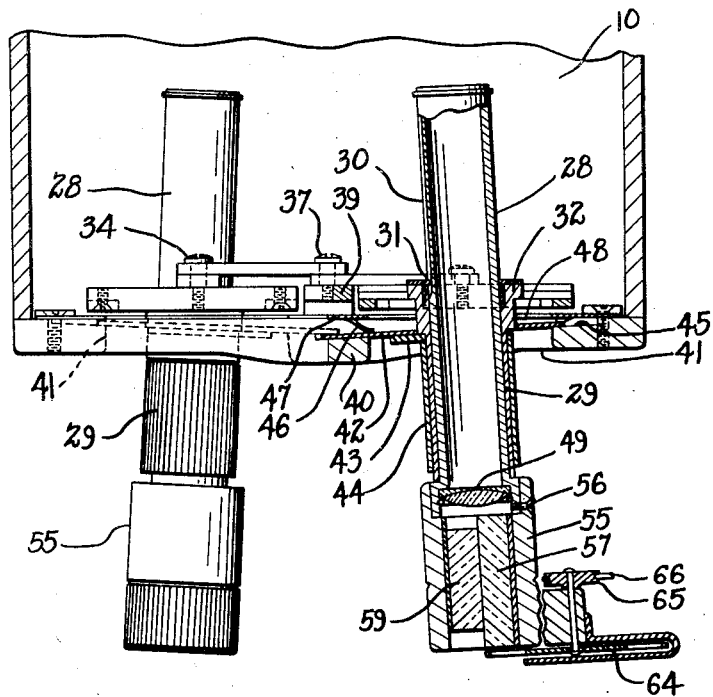
Fig. III
INVENTOR.
EDGAR D. TILLYER
BY Harry H. Styll
ATTORNEY.

June 30, 1942.   E. D. TILLYER   2,288,216
MEANS FOR RECORDING EYE MOVEMENTS
Filed Aug. 1, 1939   3 Sheets-Sheet 3
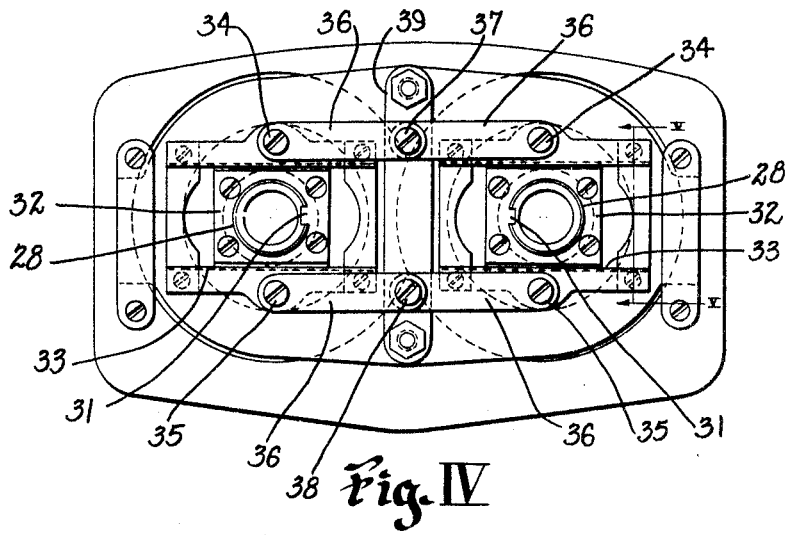
Fig. IV
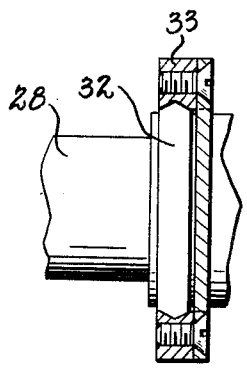
Fig. V
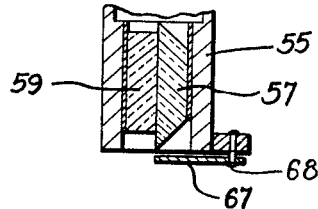
Fig. VI
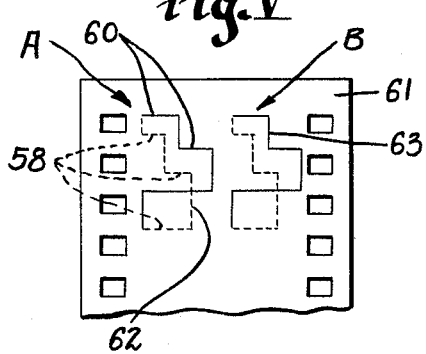
Fig. VII
INVENTOR.
EDGAR D. TILLYER
BY Harry H. Styll
ATTORNEY.

Patented June 30, 1942

2,288,216

UNITED STATES PATENT OFFICE 2,288,216

MEANS FOR RECORDING EYE MOVEMENTS

Edgar D. Tillyer, Southbridge, Mass., assignor to American Optical Company, Southbridge, Mass., a voluntary association of Massachusetts Application August 1, 1939, Serial No. 287,801

6 Claims. (Cl. 88—20)

This invention relates to new and useful improvements in eye photographing devices and has particular reference to novel means and method of recording eye movements.

Another important object of the invention is to provide improved means for recording both the horizontal and vertical movements of the eye separately or simultaneously.

Another object is to provide novel means, in a device of the character described, for distinguishing the recorded vertical movements of the eye from the horizontal recorded movements of said eye.

Another object is to provide novel means for focusing a reflected beam of light from the cornea of the eye on to a moving film.

Another object is to provide a device of the character described with means for recording the horizontal and vertical movements of the eyes either separately or simultaneously and either monocularly or binocularly.

Another object is to provide an attachment for an eye movement recording device for separating and distinguishing the horizontal movements of either one or both eyes from the vertical movements of said eyes, and method of accomplishing said result.

Another object is to provide a device of the above character, with means for simultaneously recording only the horizontal movements of one eye and the vertical movements of the other eye.

Another object is to provide means for distinguishing a recording of a particular individual from another.

Other objects and advantages of the invention will become apparent from the following description taken in connection with the accompanying drawings and it will be apparent that many changes may be made in the details of construction, arrangement of parts, and methods shown and described without departing from the spirit of the invention as expressed in the accompanying claims. I, therefore, do not wish to be limited to the exact details of construction, arrangement of parts, and methods shown and described, as the preferred forms have been given by way of illustration only.

Referring to the drawings, Fig. I is a side elevation shown partially in cross section of the device embodying the invention;

Fig. II is a face view of the photographic chamber of the device.

Fig. III is a fragmentary top plan view of the device illustrated in Fig. II, showing a portion thereof in cross section, taken as on line III—III of Fig. II;

Fig. IV is a rear elevation of the construction illustrated in Fig. III;

Fig. V is a fragmentary sectional view taken as on line V—V of Fig. IV and looking in the direction indicated by the arrows;

Fig. VI is a fragmentary sectional view taken as on line VI—VI of Fig. II and looking in the direction indicated by the arrows; and Fig. VII is a fragmentary face view diagrammatically illustrating a portion of the records of the horizontal and vertical movements of the eyes.

Devices for photographing the movements of the eyes of an individual to obtain a recording thereof are not new in the art.

Most of the prior art devices, however, were designed either for photographing only the horizontal movements of the eyes either monocularly or binocularly, or means were provided for reversing the direction of movement of the film so as to have a portion thereof running in a horizontal direction and a portion thereof running in a vertical direction for recording both the horizontal and vertical movements of the eyes. Such prior art arrangements were quite complicated and expensive as regards the mechanical means employed, and the records obtained thereby were quite difficult to interpret, that is, the horizontal and vertical movements were at spaced positions on the film and required special means for matching different sections of the film so as to obtain a coordinated record of the simultaneous, horizontal, and vertical movements of the eyes.

With such prior art devices, as far as is known, it hitherto has never been possible to simultaneously record the horizontal and vertical movements of a single eye. In the past the record of the horizontal movements of the eyes was obtained from one eye and the vertical movements from the other eye, and special means were provided for reversing the direction of movement of the film and for focusing the movements of the respective eyes on sections of the film moving in different directions.

It, therefore, is one of the primary objects of this invention to provide simple, efficient, and novel means for simultaneously recording both the horizontal and vertical movements of one or both of the eyes on a single moving film traveling in only one direction, so that both the horizontal and vertical movements of the respective eyes are definitely coordinated so that no special means are necessary for matching different sections of the films in order to obtain such coordination, as has been usual in the past.

Referring more particularly to the drawings, wherein like characters of reference designate like parts throughout the several views, the device embodying the invention as illustrated in Fig. I comprises a photographic chamber 10 having focusing means 11 adjacent one end thereof and a film guide support 12 adjacent its opposite end. A film 13 carried by a film spool 14 is pivotally supported within a housing compartment 15 located beneath the chamber 10 and is directed upwardly through the film guide support 12 to a film advancing sprocket 16 and from said sprocket to a take-up roll 17. The film sprocket 16 and film take-up roll 17 are driven by a suitable motor 18, said sprocket being directly driven, and the film take-up roll 17 is driven by a suitable belt or the like 19. The film take-up roll 17 is contained within a separate compartment 20 and when it is desired to remove the take-up roll 17 after a section of the film has been exposed, said film is segregated as by a suitable sliding knife-like blade 21, which is slidably supported in a slideway 22.

A suitable head support 23 is provided in the front of the device for supporting the head of the individual, whose eyes are being photographed, against movement during said photographing, so that only the immediate movements of the eyes are recorded. This head support is adjustable so that the eyes being photographed will be positioned in substantial alignment with the focusing means 11. The device is provided with a support 24 on which reading matter or other means may be supported to be viewed by the individual so as to effect the movements of the eyes, as naturally results through reading or the like.

A source of illumination 25 is provided for each eye. This source of illumination is contained within a casing 26 having an aperture 27 for producing a projected beam of light which is directed so as to fall upon and be reflected by the corneas of the respective eyes. These sources of illumination are so located that the reflected beams will be directed toward the longitudinal axes of the focusing means 11.

It is to be understood that although the reading matter and the sources of illumination 25 are located beneath the photographic chamber 10, they might be located above said chamber or to one or the other sides thereof. If it is desired to provide a larger field of reading matter, the said reading matter is preferably positioned above the chamber and the position of the light sources are altered accordingly.

A more detailed description of the apparatus set forth above may be obtained from issued Patent Number 2,132,520, C. C. Taylor et al., and the disclosure of this patent is made a part of the disclosure of the present application as regards this particular portion of the device.

The focusing means 11 embodying the essence of the invention as illustrated in Figs. II to VI inclusive comprises tubular members 28, slidably mounted in bearing members 29. The said tubular members are each provided with a longitudinal groove 30, in which is positioned a key 31 for holding said tubular members against rotation. The bearing members 29 are each provided with a slidable portion 32 slidably mounted in slideways 33, which, as illustrated in Fig. IV, are pivoted at 34 and 35 to link members 36. The said link members 36 are, in turn, pivoted, as illustrated at 37 and 38, to a bracket 39 carried by the front wall 40 of the chamber 10.

The slideways 33, through said link connections 36, may be manually moved up and down, with the said link members retaining the tubular members against tilting movement during said adjustment. The link members 36, therefore, facilitate moving the tubular members in an upward and downward direction, while the slide members 32 enable them to be moved in a direction substantially normal to said first movement. This arrangement provides a substantially universal movement, with the tubular members being held against rotary tilting action during said movement.

The front wall of the chamber 10 is provided with spaced openings 41, through which the tubular members 28 and bearings 29 extend and provide means permitting said upward and downward and sidewise adjustments of said tubular members relative to said chamber 10.

To shunt the entrance of light through said openings 41, suitable baffle plates 42 are provided. These baffle plates 42 are secured to a flange-like end 43 of a sleeve 44 rotatably and slidably mounted on the bearings 29. The said baffle plates 42 rest on finished surfaces 45 formed on the inner side of the front wall 40 of the chamber 10. The said plates 42 are held in sliding contact with the finished surfaces 45 by spring fingers or the like 46 formed on a plate 47 secured on the inner side of the wall 40. The said plate 47 is provided with openings 48 similar to the openings 41 in the front wall of the chamber 10.

Through the above arrangement the tubular members 28 may be moved inwardly or outwardly of the chamber and may be moved upwardly or downwardly, or sidewise, toward and away from each other. During this movement the baffle plates 42 shunt the light from entering the openings 41. Inwardly of the tubular members 28 there is supported a suitable focusing lens system 49. These lens systems 49 are adapted to receive the reflected light from the corneas of the eyes, and the focusing means is then adjusted to focus the images of said reflected beads of light on to the exposed area of the film 13 in the vicinity of the guide support means 12. To aid in focusing, the chamber 10 is provided with a window opening 50 in which is supported a ground glass screen or the like 51. A mirror or other light reflecting means 52 is pivotally supported inwardly of the chamber 10 and is adapted to receive the light reflected through said focusing means and to direct said light to said screen 51, as illustrated by the dot and dash lines 53.

A suitable hand lever 54 is provided externally of the chamber 10 for raising or lowering the reflective means 52. The ground glass screen is positioned a distance away from the reflective point of the mirror, substantially equal to the distance of the plane of exposure of the film 13 from said reflective point, so that when the beads of light are focused on said ground glass screen and the mirror is raised, they will automatically be focused in the plane of the exposed portion of the film. When the mirror 52 is raised it shunts the entrance of light through the window 50.

It is particularly pointed out that the film 13 is moved in a vertical direction. The speed thereof is so controlled as to be of a known constant. It may, however, be varied through the provision of a suitable governor or rheostat associated with the motor, but during the photographing of the eyes of a single individual the speed is preferably maintained at a known constant.

With the arrangement set forth above, only the horizontal movements of the eyes may be recorded. To record, however, both the horizontal and vertical movements, as shown in Figs. II, III and VI, an attachment 55 in the form of a sleeve may be secured to the outer end of the tubular members 28, as by screws or the like 56. This sleeve 55 carries a prism 57 which, as shown in Fig. II, has its axis disposed at substantially a 45° angle. This prism is adapted to cause the vertical movements of the eyes to be transposed to horizontal movements directed transversely of the film. It is pointed out that due to the fact that the film is moving in a vertical direction, normal vertical movements of the eye cannot be measured, as said movements are normally in the direction of travel of the film. By reversing the vertical movements of the eyes so as to dispose them in a horizontal direction, said movements can be measured and positively recorded so that they may be distinguishable from the direction of movement of the film. These reversed directional movements are indicated diagrammatically at 58 in Fig. VII. Inwardly of said sleeve 55 and adjacent the prism 57 there is supported a block of glass 59 of an optical path length substantially equal to the effective or optical path length of the prism 57. The purpose of this block of glass, which is preferably of the same index of refraction as the glass used for the prism 57, or of glass having the same effective optical length as the glass used for the portion 57, is to cause the light rays traversing said block 59 to be focused in the same plane as the light rays traversing the glass or lens medium of the prism 57.

In view of the fact that the rays traversing this block of glass 59 are not directionally altered, the normal horizontal movements of the eyes will be unaffected and will thereby be transmitted to the film as horizontal movements extending in a direction transversely of the direction of movement of the film, and for this reason can be definitely measured or recorded. The direct horizontal movements of the eyes are diagrammatically illustrated by the full lines 60 in Fig. VII. This arrangement is provided for each of the focusing systems for the respective eyes and provides means whereby both the horizontal and vertical movements of the eyes may be simultaneously recorded on a film moving in a vertical direction, said records being in adjacent relation with each other, as illustrated in Fig. VII. The recordings for the one eye are diagrammatically illustrated at A, and the recordings for the other eye are diagrammatically illustrated at B. The film is illustrated at 61. The lines extending in the direction of the movement of the film, as illustrated at 62 and 63, indicate that the eye is stationary in either one or the other directions of movement, that is, either in the horizontal or vertical direction, the line being formed by the dwell of the eye at a fixed point and by the movement of the film during said dwell, or by the apparent movement parallel with the film movement.

In order to more definitely distinguish the vertical recordings from the horizontal, a disc 64 having a plurality of cut-out portions is rotatably supported on the sleeve 55 so that the cut-out portions thereof will overlap the adjacent end of the prism. This disc is rotated by means of a belt and pulley 65 and 66, through a suitable driving connection with the motor. The purpose of this disc is to break up the beam of light into a plurality of dashes, while the light recording horizontal movements of the eye is continuous. This is diagrammatically illustrated in Fig. VII. It is to be understood that such an arrangement may be provided for both eyes or for both horizontal and vertical movements or may be left out of either or both. It is also to be understood that instead of utilizing it with the prism, it might be used with the block 59 if desired.

If it is desired to record only the horizontal movements of the eyes, an opaque baffle plate or the like 67, pivotally supported as illustrated at 68, Fig. VI, on the sleeve 55, may be moved into alignment with the adjacent end of the prism, thereby cutting off the transmission of light therethrough. This will allow only the horizontal movements of the eye to be recorded. A similar baffle plate may be provided for superpositioning over the adjacent end of the block 59 to shunt the passage of light therethrough, in which instance only the light recording the vertical movement of the eyes would be permitted to be transmitted through the prism.

It is also to be understood that if desired, the sleeve 55 for one eye may be provided only with a prism, and the sleeve 55 for the other eye only with a bar 59, whereby the vertical movements will be taken from one eye and the horizontal movements from the other.

In view of the fact that the tubular members 28 are supported against rotation, the prism 57 and block of glass 59 will maintain its desired position relative to the vertical and horizontal meridians of the eye.

It is to be noted that the recording instrument may utilize only one of said focusing devices, that is, the vertical and horizontal movements of only one eye may be recorded, assuming that both eyes are normal and function in a similar manner.

The method of recording the movements of the eyes is substantially as follows: The patient's head is positioned within the head supporting device 23 and is adjusted so that the eye is aligned substantially with the focusing means 11, it being assumed that the film is in threaded position with the device, as set forth above. The mirror 52 is lowered and the light 25 is illuminated. The patient is asked to look at a fixed point in the area at which the reading matter or the like is to be exposed. The direction in which he is looking is indicated by the dot and dash line 69. The source of illumination 25 produces a beam of light indicated by the dash line 70, which is directed on to the cornea of the eye and is reflected by said cornea toward the focus means 11, as illustrated by the dot and dash line 71. The focusing means 11 is then adjusted through movement thereof as provided by its adjustable supporting mechanism, such as set forth above, first by moving the longitudinal axis of the tubular member 28 into alignment with the reflected beam of light and by thereafter moving said tubular member longitudinally of the bearing member 29 to focus the beam of light on to the translucent screen 51. The focused beam will appear as a point of light on said screen. This procedure is followed for both eyes in instances where the binocular movements of the eyes is being recorded. The motor 18 is then energized to cause the film to rotate. The mirror 52 is then lifted to allow the projected beam of light 53 to focus in the plane of the exposed area of the film. The patient or individual is then asked to read subject matter exposed at 24, thereby causing definite movements to be imparted to the eyes. The horizontal movements of the eyes will be directly recorded on the film and the vertical movements will be rotated substantially 90° by the prism 57 and will be directed to said film as horizontally directed movements.

The rotating disc 64 causes said beam of light to be chopped up so as to produce a series of dashes which will distinguish said vertical movements from the horizontal movements of the eye.

When it is desired to merely check the movements of the eyes when looking at subject matter other than reading, for example, a photograph the patient is merely instructed to look at said photograph, and the points of interest of said photograph may be determined by recording the direction of movements of the eyes.

If it is desired to determine the coordination of the movements of the two eyes, the movements of both eyes are simultaneously recorded. If it is merely desired to obtain the monocular movement of an eye, only the movements of one eye are recorded. If, on the other hand, it is merely desired to obtain the general horizontal and vertical movements of the eyes, said horizontal movements may be recorded from one eye and the vertical movements from the other eye. The film is continually rotated at a constant known speed during said recording. At the completion of the exposure, the motor 18 is deenergized, the film is cut or severed by manipulation of the knife 21, and the exposed portion thereof is removed from the compartment 20 and developed. With this arrangement, both the simultaneous, horizontal, and vertical movements of the eyes are recorded in adjacent coordinated relation with each other.

If desired, instead of using a film, any other desirable light sensitive paper may be used.

It is also to be understood that instead of using a single film, two films may be provided, one for each eye, or a suitable moving light sensitive plate may be employed.

In order to identfy the section of film of one individual from a section of film of another individual, a suitable marking device in the form of a spring pressed plunger 72 may be employed, by which the film may be pricked or cut in such a manner as to distinguish one film from the other. This is accomplished by pressing the point of the spring pressed plunger into engagement with the film.

If desired, the means which is exposed to the eye may be located on the top of the chamber 10, with the positions of the sources of illumination 25 altered in order to accomplish the results desired. The photographic chamber 10 is a dark chamber, and, of course, the compartments 15 and 20 are also sealed against the entrance of light.

It is to be understood that, if desired, other suitable means for bringing the images to position on the film may be used, such as a rotary variable prism such as the Riseley prism may be attached to the tube containing the lenses, thus leaving the tube in fixed position and simultaneously both changing the axis and power of the prism to alter the position of the images on the film or ground glass screen.

From the foregoing description it will be seen that simple, efficient, and economical means and method have been provided for accomplishing all the objects and advantages of the invention, particularly that of recording both the horizontal and vertical movements of the eye simultaneously.

Having described my invention, I claim:

1. A device for photographically recording the movement of an eye of a person comprising a dark chamber, means for supporting a moving film in said chamber with a portion thereof exposed to receive reflected light from the cornea of the eye of an individual whose eye movement is to be recorded, means for locating the head position of said individual relative to said dark chamber, means for directing a beam of light onto the cornea of the eye of said individual at said head position at an angle whereby the light reflected by said cornea may be directed to the chamber, a focusing member adjustably supported to receive the light reflected by the cornea and for directing said light to the exposed portion of the film, said light focusing means having an optical system consisting of a focusing lens and a prism and an adjacent block of glass of substantially equal optical path lengths, said block of glass being adapted to permit the reflected rays to pass therethrough with substantially no directional alteration and the prism being adapted to directionally change the path of light passing therethrough substantially 45°.

2. A device for photographically recording the movement the eyes of a person simultaneously comprising a dark chamber, means for supporting a moving film in said chamber with a portion thereof exposed to receive reflected light from the corneas of the eyes of an individual whose eye movements are to be recorded, means for locating the head position of said individual relative to said dark chamber, means for directing a beam of light onto the corneas of the eyes of said individual at said head position at an angle whereby the light reflected by said corneas may be directed to the chamber, a pair of focusing members adjustably supported to receive the light reflected by the corneas and for directing said light to the exposed portion of the film, said light focusing means each comprising an optical system consisting of a focusing lens and a prism and an adjacent block of glass, said block of glass having an optical path length substantially equal to the effective or optical path length of the prism, the said block of glass being adapted to permit the reflected rays to pass through the focusing means with substantially no directional alteration and the prism being adapted to directionally change the path of light passing therethrough substantially 45°.

3. A device for photographically recording the horizontal and vertical movements of an eye of a person comprising a dark chamber, means for supporting a film for movement in a direction longitudinally thereof in said dark chamber with a portion of said film exposed to receive reflected light from the cornea of the eye of an individual whose eye movement is to be recorded, means for locating the head position of said individual relative to said dark chamber, means for directing a beam of light onto the cornea of the eye of said individual at said head position at an angle whereby the light reflected by said cornea may be directed to the chamber, a focusing member adjustably supported to receive the light reflected by the cornea and for directing said light to the exposed portion of the film, said light focusing means having an optical system consisting of a focusing lens and a prism and an adjacent block of glass of substantially equal optical path lengths adapted to permit the light reflected by the cornea to pass therethrough, said block of glass being adapted to transmit the horizontal movements of the eyes to the exposed portion of the film with substantially no directional alteration and the prism being adapted to rotate the vertical movements to be directed to the film as horizontally directed movements.

4. A device for photographically recording the horizontal and vertical movements of the eyes of a person simultaneously comprising a dark chamber, means for supporting a film for movement in a direction longitudinally thereof in said dark chamber with a portion of said film exposed to receive reflected light from the corneas of the eyes of an individual whose eye movements are to be recorded, means for locating the head position of said individual relative to said dark chamber, means for directing a beam of light onto the corneas of the eyes of said individual at said head position at an angle whereby the light reflected by said corneas may be directed to the chamber, a pair of focusing members adjustably supported to receive the light reflected by the corneas and for directing said light to the exposed portion of the film, said light focusing means each having an optical system consisting of a focusing lens and a prism and an adjacent block of glass of substantially equal optical path lengths adapted to permit the light reflected by the corneas to pass therethrough, the said block of glass being adapted to transmit the horizontal movements of the eyes to the exposed portion of the film with substantially no directional alteration and the prism being adapted to rotate the vertical movements to be directed to the film as horizontally directed movements.

5. A device for photographically recording the movement of an eye of a person comprising a dark chamber, means for supporting a moving film in said chamber with a portion thereof exposed to receive reflected light from the cornea of the eye of an individual whose eye movement is to be recorded, means for locating the head position of said individual relative to said dark chamber, means for directing a beam of light onto the cornea of the eye of said individual at said head position at an angle whereby the light reflected by said cornea may be directed to the chamber, a focusing member adjustably supported to receive the light reflected by the cornea and for directing said light to the exposed portion of the film, said light focusing means having an optical system consisting of a focusing lens and a prism and an adjacent block of glass of substantially equal optical path lengths, said block of glass being adapted to permit the reflected rays to pass therethrough with substantially no directional alteration and the prism being adapted to directionally change the path of light passing therethrough substantially 45° and means for intermittently interrupting the light passing through one of said members of substantially equal optical path lengths.

6. A device for photographically recording the movements of an eye of a person comprising a dark chamber adapted to be positioned before the eye of the person whose eye movement is to be recorded, said dark chamber having means for supporting a moving film therein with a portion of said film exposed to receive light reflected from the cornea of the eye of said person, means for directing a beam of light onto the cornea of the eye at an angle whereby the light reflected by said cornea may be directed toward the chamber, a focusing member adjustably supported to receive the reflected light for directing said light to the exposed portion of the film, said light focusing means having an optical system for receiving said reflected light consisting of a focusing lens, a prism and an adjacent block of glass, said block of glass having an optical path length substantially equal to the effective or optical path length of the prism, said block of glass being adapted to permit the reflected rays to pass therethrough with substantially no directional alteration and the prism being adapted to directionally change the path of light passing therethrough.

EDGAR D. TILLYER.